US012382562B2

(12) United States Patent
Ryu

(10) Patent No.: US 12,382,562 B2
(45) Date of Patent: Aug. 5, 2025

(54) LED CONTROL APPARATUS WITH FUNCTION TO REMOVE ABNORMAL LIGHT EMISSION OF LED MATRIX

(71) Applicant: FINDEACHIP CO,. LTD., Cheongju-si (KR)

(72) Inventor: Dongyeol Ryu, Cheongju-si (KR)

(73) Assignee: FINDEACHIP CO. LTD., Cheongju-si (KR)

( * ) Notice: Subject to any disclaimer, the term of this patent is extended or adjusted under 35 U.S.C. 154(b) by 0 days.

(21) Appl. No.: 18/288,991

(22) PCT Filed: Oct. 20, 2023

(86) PCT No.: PCT/KR2023/016352

§ 371 (c)(1),
(2) Date: Oct. 30, 2023

(87) PCT Pub. No.: WO2024/225541

PCT Pub. Date: Oct. 31, 2024

(65) Prior Publication Data

US 2025/0089142 A1 Mar. 13, 2025

(30) Foreign Application Priority Data

Apr. 27, 2023 (KR) ........................ 10-2023-0055606

(51) Int. Cl.
*H05B 45/59* (2022.01)
*H05B 45/46* (2020.01)

(52) U.S. Cl.
CPC ............. *H05B 45/59* (2022.01); *H05B 45/46* (2020.01)

(58) Field of Classification Search
CPC ................................ H05B 45/59; H05B 45/46
See application file for complete search history.

(56) References Cited

U.S. PATENT DOCUMENTS 10,692,422 B2 * 6/2020 Yao .......................... G09G 3/32
2009/0309855 A1 * 12/2009 Wang ....................... G09G 3/32
345/82

(Continued)

FOREIGN PATENT DOCUMENTS

JP 2014507711 A * 3/2014
KR 10-2003-0047131 A 6/2003

(Continued)

*Primary Examiner* — Adam D Houston
(74) *Attorney, Agent, or Firm* — Revolution IP, PLLC

(57) ABSTRACT

An LED control device includes: an LED driver controlling a current flow for driving the LED matrix by supplying an applied voltage $V_{LED}$ to digit lines connecting a plurality of LED anode terminals to a plurality of digit pins and supplying a ground voltage VSS to segment lines connecting a plurality of LED cathode terminals to a plurality of segment pins within the LED matrix; a key scanner detecting a signal input to the key matrix by performing key scanning on the key matrix; a first abnormal light emission remover supplying the ground voltage VSS to the digit lines through the digit pins; a second abnormal light emission remover supplying the applied voltage $V_{LED}$ to the segment lines through the segment pins; and a control unit controlling operation states of the LED driver, the key scanner, the first abnormal light emission remover, and the second abnormal light emission remover.

7 Claims, 4 Drawing Sheets

(56) References Cited

U.S. PATENT DOCUMENTS

| | | | | |
|---|---|---|---|---|
| 2012/0176062 | A1* | 7/2012 | Sato | H05B 45/46 315/312 |
| 2013/0119867 | A1* | 5/2013 | Yu | H05B 45/3725 315/120 |
| 2013/0271006 | A1* | 10/2013 | Shiu | H05B 45/46 315/121 |
| 2013/0278151 | A1* | 10/2013 | Lear | H01S 5/18388 315/210 |
| 2023/0262854 | A1* | 8/2023 | Miskin | H05B 45/60 315/201 |
| 2024/0040681 | A1* | 2/2024 | Xu | H05B 45/34 |
| 2025/0089142 | A1* | 3/2025 | Ryu | H05B 45/10 |

FOREIGN PATENT DOCUMENTS

| | | | | | |
|---|---|---|---|---|---|
| KR | 10-2023-0043761 | A | | 3/2023 | |
| KR | 102593283 | B1 | * | 10/2023 | |
| WO | WO-2022076798 | A1 | * | 4/2022 | G09G 3/32 |
| WO | WO-2024249028 | A1 | * | 12/2024 | B60Q 1/1407 |

* cited by examiner

LED CONTROL APPARATUS WITH FUNCTION TO REMOVE ABNORMAL LIGHT EMISSION OF LED MATRIX

TECHNICAL FIELD

The disclosure relates to a light emitting diode (LED) control device having a function of removing abnormal light emission of an LED matrix.

BACKGROUND ART

An LED is a semiconductor device composed of n-type and p-type junctions, which emits light by combining electrons and holes when a voltage is applied to the LED. Unlike filament heating of incandescent lamps, when current is injected, the LED immediately converts the current into light and thus has high light efficiency.

In other words, LEDs have been developed to emit red, green, blue, and white light, which allows choice of a desired color. LEDs have such all characteristics including eco-friendliness and energy saving through excellent power efficiency that they replace traditional lightings.

With these advantages, LEDs have been rapidly replacing lighting markets previously occupied by automobiles, traffic lights, TVs, billboards, and general lighting, and their applications are expanding to various light sources such as displays, smartphones, and the back light unit (BLU) of liquid crystal displays (LCDs).

In relation to these LEDs, various attempts have been made to achieve technical improvements in various directions, such as increasing light emission efficiency and improving light emission control. The applicant has conducted research to solve an abnormal light emission phenomenon occurring in the process of driving an LED matrix and key-scanning a key matrix in a system in which an input device implemented as the key matrix and an output device implemented as the LED matrix are connected to each other in a home appliance, and the research result is given as the disclosure.

In this regard, prior art includes "Drive chip, drive circuit and drive method capable of eliminating led ghost" (hereinafter, referred to as "prior art") in U.S. Registered Patent Publication No. 10692422.

However, the prior art and other existing technologies related to removal of abnormal light emission of LEDs have limitations in effectively removing all various types of abnormal light emission occurring in the process of driving an LED matrix and key-scanning a key matrix, while providing a function of removing only a certain type of abnormal light emission.

DISCLOSURE

Technical Problem

An aspect of the disclosure is to address at least the above-mentioned problems and to provide a technique of removing all types of abnormal light emission generated by charging parasitic capacitors of digit pins or discharging parasitic capacitors of segment pins during driving of an LED matrix and key scanning of a key matrix.

Technical Solution

To achieve the above object, a light emitting diode (LED) control device connected to an LED matrix and a key matrix to perform driving of the LED matrix and key scanning of the key matrix, and having a function of removing abnormal light emission of the LED matrix generated during the driving of the LED matrix and the key scanning of the key matrix according to the disclosure includes: an LED driver controlling a current flow for driving the LED matrix by supplying an applied voltage $V_{LED}$ to digit lines connecting a plurality of LED anode terminals to a plurality of digit pins and supplying a ground voltage VSS to segment lines connecting a plurality of LED cathode terminals to a plurality of segment pins within the LED matrix: a key scanner detecting a signal input to the key matrix by performing key scanning on the key matrix: a first abnormal light emission remover supplying the ground voltage VSS to the digit lines through the digit pins: a second abnormal light emission remover supplying the applied voltage $V_{LED}$ to the segment lines through the segment pins; and a control unit controlling operation states of the LED driver, the key scanner, the first abnormal light emission remover, and the second abnormal light emission remover.

The control unit includes: a first controller controlling the operation state of the LED driver to cause a voltage supply period and a non-voltage supply period following the voltage supply period to appear, to control light emission of the LED matrix: a second controller controlling the operation state of the key scanner to cause a key scan period and a scan pause period following the key scan period to appear, for the key scanning of the LED matrix: a third controller activating the first abnormal light emission remover, when the non-voltage supply period follows the voltage supply period by controlling the operation state of the LED driver through the first controller to cause; and a fourth controller activating the second abnormal light emission remover, when the scan pause period follows the key scan period by controlling the operation state of the key scanner through the second controller.

Further, the third controller deactivates the first abnormal light emission remover, before the voltage supply period appears by controlling the operation state of the LED driver through the first controller or the key scan period appears by controlling the operation state of the key scanner through the second controller after the activation of the first abnormal light emission remover.

Further, the fourth controller deactivates the second abnormal light emission remover, before the voltage supply period appears by controlling the operation state of the LED driver through the first controller after the activation of the second abnormal light emission remover.

Further, the first abnormal light emission remover removes abnormal light emission of LEDs on digit lines connected to a first segment pin of the segment pins, caused by a current flow generated by voltage differences between the segment pins and charged first parasitic capacitors of the digit pins connected to the digit lines, by supplying the ground voltage to the digit lines and discharging the charged first parasitic capacitors.

Further, the first abnormal light emission remover removes abnormal light emission of LEDs on digit lines of first to $(n-1)^{th}$ digit pins of digit pins connected to an $m^{th}$ segment pin of the segment pins, caused by a current flow generated by voltage differences between the segment pins and charged first parasitic capacitors of the first to $(n-1)^{th}$ digit pins of the digit pins connected to the digit lines during light emission of an LED connected to an $n^{th}$ digit pin of the digit pins and the $m^{th}$ segment pin of the segment pins, by supplying the ground voltage to the digit lines and discharging the charged first parasitic capacitors.

Further, the second abnormal light emission remover removes abnormal light emission of LEDs on segment lines connected to a first digit pin of the digit pins, caused by a current flow generated by voltage differences between the digit pins and second parasitic capacitors of the segment pins connected to the segment lines, which are discharged by the key scanning of the key matrix through the key scanner, by supplying the applied voltage to the segment lines and charging the discharged second parasitic capacitors.

Advantageous Effects

The disclosure has the following effects.

First, abnormal light emission generated by charging parasitic capacitors of digit pins during driving of an LED matrix may be removed.

Secondly, abnormal light emission generated by discharging parasitic capacitors of segment pins during key scanning of a key matrix, associated with the driving of the LED matrix may be removed.

MODE FOR INVENTION

A preferred embodiment of the disclosure will be described in more detail with reference to the attached drawings. For brevity of description, known technical details will be omitted or described briefly.

<Description of an LED Control Device Having a Function of Removing Abnormal Light Emission of an LED Matrix>

Figure 1:
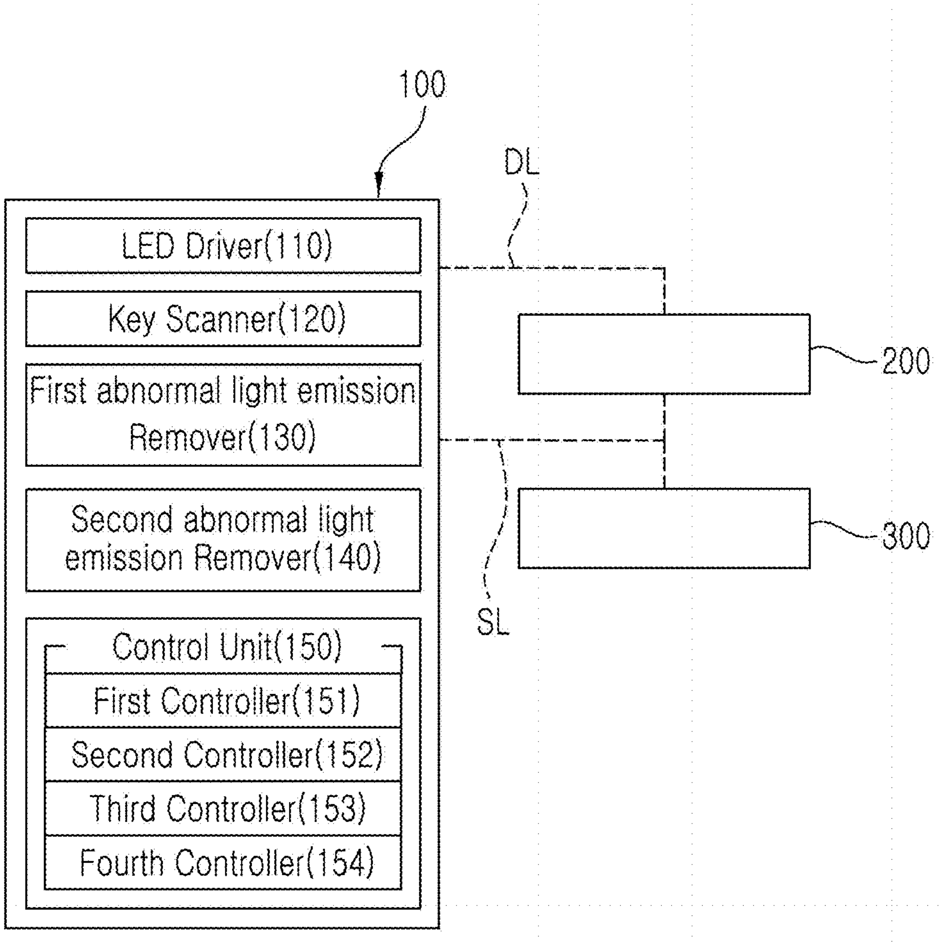
FIG. 1 is a block diagram illustrating a configuration of a light emitting diode (LED) control device having a function of removing abnormal light emission of an LED matrix according to the disclosure.

The disclosure relates to an LED control device 100 which is connected to an LED matrix 200 and a key matrix 300 to perform driving of the LED matrix 200 and key scanning of the key matrix 300, and which has a function of removing abnormal light emission occurring during the driving of the LED matrix 200 and the key scanning of the key matrix 300. As illustrated in FIG. 1, the LED control device 100 includes an LED driver 110, a key scanner 120, a first abnormal light emission remover 130, a second abnormal light emission remover 140, and a control unit 150.

The LED control device 100 is a component which is installed in a specific electronic product and operates in conjunction with the LED matrix 200 and the key matrix 300. The LED control device is included and functions as a component within an integrated circuit (IC).

Figure 2:
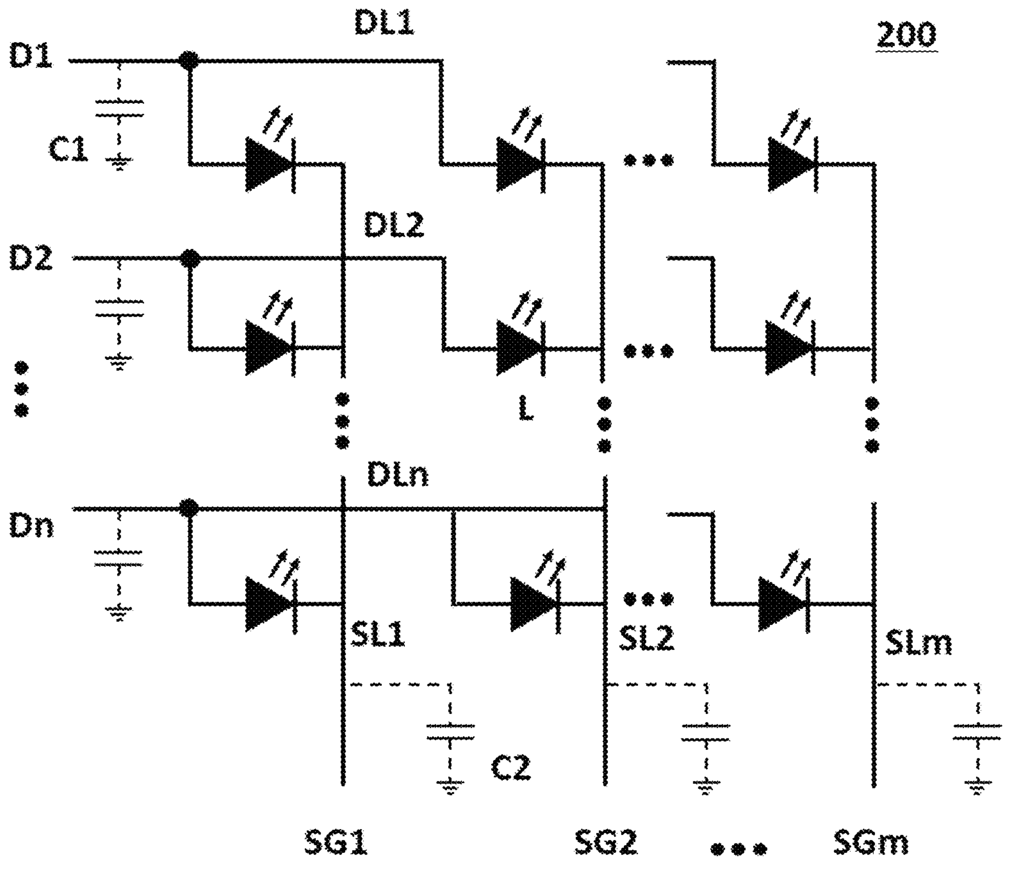
FIG. 2 is a block diagram illustrating a configuration and connection structure of an LED matrix connected to an LED control device having a function of removing abnormal light emission of the LED matrix according to the disclosure.

The LED matrix 200 refers to an output device which is installed in a specific electronic product and displays specific information through light emission. The LED matrix 200 includes digit lines DL1, DL2, . . . , DLn connecting a plurality of LED anode terminals to a plurality of digit pins D1, D2, . . . Dn, and segment lines SL1, SL2, . . . . SLm connecting a plurality of LED cathode terminals to a plurality of segment pins SG1, SG2, . . . , SGm, thus having a structure and configuration as illustrated in FIG. 2.

The LED matrix 200 operates in conjunction with a clock generator that generates a reference clock signal in response to a signal of an oscillator provided in the same IC including the LED control device 100, and operates on the basis of each later-described period.

The key matrix 300 detects a signal by key scanning in which an applied voltage $V_{LED}$ used to drive the LED matrix 200 is sequentially applied to lines forming columns and a user key input is determined based on potential changes in lines forming rows, and the IC controls the driving of the LED matrix 200 based on the detected signal.

Figure 3:
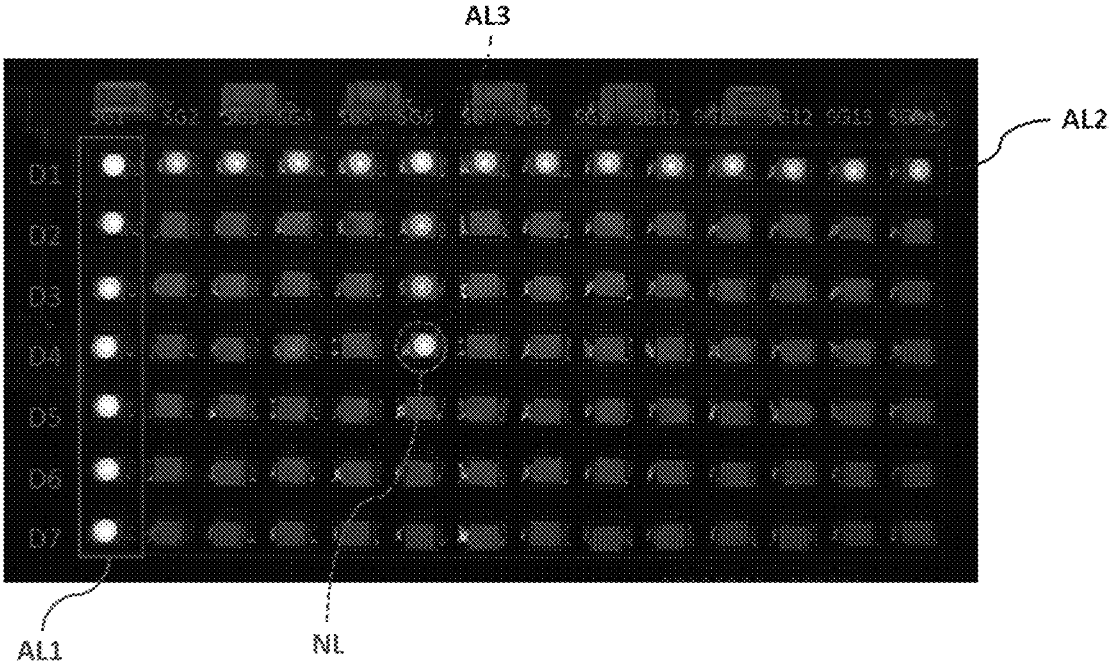
FIG. 3 is a picture illustrating types of abnormal light emission that may occur in an LED matrix connected to an LED control device having a function of removing abnormal light emission of the LED matrix according to the disclosure.

In the process of performing the driving of the LED matrix 200 and the key scanning of the key matrix 300, various types of abnormal light emission AL1, AL2, and AL3 in which certain LEDs not intended to be controlled emit light occur, as illustrated in FIG. 3. The abnormal light emission may be removed by the LED control device 100.

The LED driver 110 controls a current flow for driving the LED matrix 200 by supplying the applied voltage $V_{LED}$ to digit lines DL in the LED matrix 200 and a ground voltage VSS to segment lines SL.

The key scanner 120 detects a signal input to the key matrix 300 by performing key scanning on the key matrix 300.

The first abnormal light emission remover 130 removes first and third types of abnormal light emission AL1 and AL3 by supplying the ground voltage VSS to the digit lines DL1, DL2, . . . , DLn through the digit pins D1, D2, . . . , Dn.

The second abnormal light emission remover 140 removes a second type of abnormal light emission AL2 by supplying the applied voltage $V_{LED}$ to the segment lines SL1, SL2, . . . , SLm through the segment pins SG1, SG2, . . . , SGm.

The control unit 150 controls operation states of the LED driver 110, the key scanner 120, the first abnormal light emission remover 130, and the second abnormal light emission remover 140. For this purpose, the control unit 150 specifically includes a first controller 151, a second controller 152, a third controller 153, and a fourth controller 154, as illustrated in FIG. 1.

The first controller 151 controls the operation state of the LED driver 110 such that a voltage supply period VP and a non-voltage supply period NP following the voltage supply period VP appear, to control light emission of the LED matrix 200.

Further, the second controller 152 controls the operation state of the key scanner 120 such that a key scan period KS and a scan pause period NK following the key scan period KS appear, for key scanning of the key matrix 300.

Next, when the voltage supply period VP is followed by the non-voltage supply period NP by controlling the operation state of the LED driver 110 through the first controller 151, the third controller 153 activates the first abnormal light emission remover 130.

Further, before the voltage supply period VP appears by controlling the operation state of the LED driver 110 again through the first controller or the key scan period KS appears by controlling the operation state of the key scanner 120 through the second controller 152 after the activation of the first abnormal light emission remover 130, the third controller 153 deactivates the first abnormal light emission remover 130.

Figure 4:
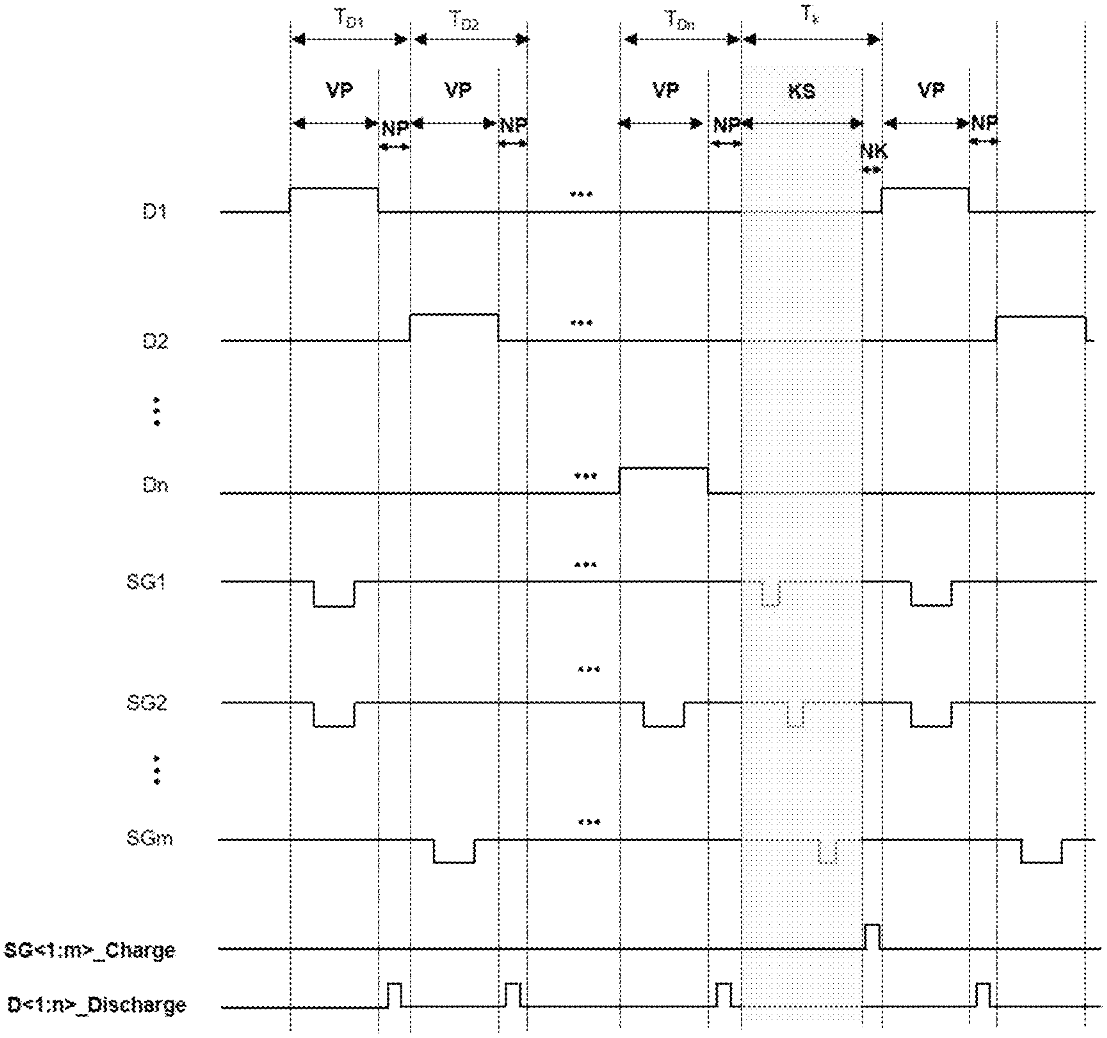
FIG. 4 is a diagram referred to for describing an operation of controlling driving of an LED matrix and a key matrix and performing a function of removing abnormal light emission trough a control unit in an LED control device having the function of removing abnormal light emission of the LED matrix according to the disclosure.

As illustrated in FIG. 4, therefore, the first and third types of abnormal light emission AL1 and AL3 are removed by activating the first abnormal light emission remover 130 only within a pause interval from the non-voltage supply period NP following the voltage supply period VP to before the appearance of a new voltage supply period VP or the key scan period KS.

Specifically, as illustrated in FIG. 3, in the case of the first type of abnormal light emission AL1 which occurs to LEDs L on digit lines DL1, DL2, . . . , DL7 connected to a first segment pin SI of segment pins SG1, SG2, . . . , SG14 due to a current flow generated by voltage differences between charged first parasitic capacitors C1 of digit pins D1, D2, . . . D7 connected to the digit lines DL1, DL2, . . . DL7 and the segment pins SG1, SG2, . . . . SG14 as the first parasitic capacitors C1 are charged, the first type of abnormal light emission AL1 is removed by discharging the first parasitic capacitors C1 by supplying the ground voltage VSS to the digit lines DL1, DL2, DL7 through activation of the first abnormal light emission remover 130.

Further, as illustrated in FIG. 3, in the case of the third type of abnormal light emission AL2 which occurs to LEDs L on digit lines DL1, DL2, and DL3 of first to $(n-1)^{th}$ digit pins D1, D2, and D3 of the digit pins D1, D2, . . . , D7 connected to an $m^{th}$ (m is a natural member and m=6 in FIG. 3) segment pin SG6 of the segment pins SG1, SG2, . . . , SG14 due to a current flow which is generated by voltage differences between charged first parasitic capacitors C1 of the first to $(n-1)^{th}$ digit pins D1, D2, and D3 of the digit pins D1, D2, . . . , D7 connected to the digit lines DL1, DL2, . . . . DL7 and the segment pins SG1, SG2, . . . . SG14, as the first parasitic capacitors C1 are charged while an LED L connected to an $n^{th}$ (n is a natural number and n=4 in FIG. 3) digit pin D4 of the digit pins D1, D2, . . . , D7 and the $m^{th}$ segment pin SG6 of the segment pins SG1, SG2 . . . . SG14 normally emits light NL, as is intended in terms of control, the third type of abnormal light emission AL3 is removed by discharging the charged first parasitic capacitors C1 of the first to $(n-1)^{th}$ digit pins D1, D2, and D3 by supplying the ground voltage VSS to the digit lines DL1, DL2, . . . . DL7 through activation of the first abnormal light emission remover 130.

In summary, regarding removal of the first and third types of abnormal light emission AL1 and AL3 through activation of the first abnormal light remover 130, it may be noted that because the pause interval from the non-voltage supply period NP following the voltage supply period VP to before a new voltage supply period VP or the key scan period KS appears, the charged first capacitors C1 are properly discharged by supplying the ground voltage VSS, as illustrated in FIG. 4.

Finally, when the key scan period KS is followed by the scan pause period NK by controlling the operation state of the key scanner 120 through the second controller 152, the fourth controller 154 activates the second abnormal light emission remover 140.

Further, before the voltage supply period VP appears by controlling the operation state of the LED driver 110 through the first controller 151 after the activation of the second abnormal light emission remover 140, the fourth controller 154 deactivates the second abnormal light emission remover 140.

In this regard, the activation of the first abnormal light emission remover 130 through the third controller 153 and the activation of the second abnormal light emission remover 140 through the fourth controller 154 are performed preferably independently, as illustrated in FIG. 4. Particularly, it is preferred that simultaneous activation of the first abnormal light emission remover 130 and the second abnormal light emission remover 140 through driving of the two controllers does not occur.

This is because when the first abnormal light emission remover 130 and the second abnormal light emission remover 140 are activated simultaneously, a reverse voltage Vr is generated on an LED L, and the use of a high voltage destroys or shortens the life of the LED matrix 200.

Therefore, as illustrated in FIG. 4, the second type of abnormal light emission AL2 is removed by activating the second abnormal light emission remover 140 only within a pause interval from the scan pause period NK following the key scan period KS to before the voltage supply period VP appears.

Specifically, as illustrated in FIG. 3, in the case of the second type of abnormal light emission AL2 which occurs to LEDs L on the segment lines SL1, SL2, . . . , SL14 connected to a first digit pin D1 of the digit pins D1, D2, . . . , D7 due to a current flow generated by voltage differences between discharged second parasitic capacitors C2 of the segment pins SG1, SG2, . . . , SG 14 connected to the segment lines SL1, SL2, . . . , SL14 and the digit pins D1, D2, . . . , D7 as the second parasitic capacitors C2 are discharged in the process of performing a key scan function through the segment pins SG1, SG2, . . . , SG14, the second type of abnormal light emission AL2 is removed by charging the second parasitic capacitors C2 by supplying the applied voltage $V_{LED}$ to the segment lines SL1, SL2, . . . , SLm through activation of the second abnormal light emission remover 140.

In summary, regarding removal of the second type of abnormal light emission AL2 through activation of the second abnormal light remover 140, it may be noted that because a pause interval from the scan pause period NK following the key scan period KS to before the voltage supply period VP KS is generated, the discharged second capacitors C2 are properly charged by supplying the applied voltage $V_{LED}$, as illustrated in FIG. 4.

The embodiment disclosed in the disclosure is intended to illustrate, not to limit, the technical ideas of the disclosure. The scope of the technical ideas of the disclosure is not limited by these embodiments. The scope of protection should be construed in accordance with the claims below, and interpreted as encompassing all technical ideas within its equivalency.

DESCRIPTION OF REFERENCE NUMERALS

100: LED control device
110: LED driver
120: key scanner
130: first abnormal light emission remover
140: second abnormal light emission remover
150: control unit
151: first controller
152: second controller
153: third controller
154: fourth controller
200: LED matrix
300: key matrix

The invention claimed is:

1. A light emitting diode (LED) control device connected to an LED matrix and a key matrix to perform driving of the LED matrix and key scanning of the key matrix, and having a function of removing abnormal light emission of the LED matrix generated during the driving of the LED matrix and the key scanning of the key matrix, the LED control device comprising:

an LED driver controlling a current flow for driving the LED matrix by supplying an applied voltage $V_{LED}$ to digit lines connecting a plurality of LED anode terminals to a plurality of digit pins and supplying a ground voltage VSS to segment lines connecting a plurality of LED cathode terminals to a plurality of segment pins within the LED matrix;

a key scanner detecting a signal input to the key matrix by performing key scanning on the key matrix;

a first abnormal light emission remover supplying the ground voltage VSS to the digit lines through the digit pins;

a second abnormal light emission remover supplying the applied voltage $V_{LED}$ to the segment lines through the segment pins; and a control unit controlling operation states of the LED driver, the key scanner, the first abnormal light emission remover, and the second abnormal light emission remover.

2. The LED control device of claim 1, wherein the control unit includes:

a first controller controlling the operation state of the LED driver to cause a voltage supply period and a non-voltage supply period following the voltage supply period to appear, to control light emission of the LED matrix;

a second controller controlling the operation state of the key scanner to cause a key scan period and a scan pause period following the key scan period to appear, for the key scanning of the LED matrix;

a third controller activating the first abnormal light emission remover, when the non-voltage supply period follows the voltage supply period by controlling the operation state of the LED driver through the first controller to cause; and a fourth controller activating the second abnormal light emission remover, when the scan pause period follows the key scan period by controlling the operation state of the key scanner through the second controller.

3. The LED control device of claim 2, wherein the third controller deactivates the first abnormal light emission remover, before the voltage supply period appears by controlling the operation state of the LED driver through the first controller or the key scan period appears by controlling the operation state of the key scanner through the second controller after the activation of the first abnormal light emission remover.

4. The LED control device of claim 3, wherein the fourth controller deactivates the second abnormal light emission remover, before the voltage supply period appears by controlling the operation state of the LED driver through the first controller after the activation of the second abnormal light emission remover.

5. The LED control device of claim 2, wherein the first abnormal light emission remover removes abnormal light emission of LEDs on digit lines connected to a first segment pin of the segment pins, caused by a current flow generated by voltage differences between the segment pins and charged first parasitic capacitors of the digit pins connected to the digit lines, by supplying the ground voltage to the digit lines and discharging the charged first parasitic capacitors.

6. The LED control device of claim 5, wherein the first abnormal light emission remover removes abnormal light emission of LEDs on digit lines of first to $(n-1)^{th}$ digit pins of digit pins connected to an $m^{th}$ segment pin of the segment pins, caused by a current flow generated by voltage differences between the segment pins and charged first parasitic capacitors of the first to $(n-1)^{th}$ digit pins of the digit pins connected to the digit lines during light emission of an LED connected to an $n^{th}$ digit pin of the digit pins and the $m^{th}$ segment pin of the segment pins, by supplying the ground voltage to the digit lines and discharging the charged first parasitic capacitors.

7. The LED control device of claim 2, wherein the second abnormal light emission remover removes abnormal light emission of LEDs on segment lines connected to a first digit pin of the digit pins, caused by a current flow generated by voltage differences between the digit pins and second parasitic capacitors of the segment pins connected to the segment lines, which are discharged by the key scanning of the key matrix through the key scanner, by supplying the applied voltage to the segment lines and charging the discharged second parasitic capacitors.

* * * * *